United States Patent [19]

McGill

[11] 4,326,361
[45] Apr. 27, 1982

[54] ADJUSTABLE HUB MOUNT FOR CIRCULAR SAW BLADE

[75] Inventor: William C. McGill, San Marcos, Calif.

[73] Assignee: Union Carbide Corporation, Danbury, Conn.

[21] Appl. No.: 163,513

[22] Filed: Jun. 27, 1980

[51] Int. Cl.³ .............................................. B24B 45/00
[52] U.S. Cl. .......................................... 51/168; 83/666
[58] Field of Search ............................ 51/168; 83/666

[56] References Cited

U.S. PATENT DOCUMENTS

| | | | |
|---|---|---|---|
| 1,459,683 | 6/1923 | Norris | 51/168 |
| 2,398,664 | 4/1946 | Paul | 51/168 |
| 2,841,928 | 7/1958 | Trescott | 51/168 |
| 2,841,929 | 7/1958 | Stelmachowski | 51/168 |
| 3,646,711 | 3/1972 | Oishi | 51/168 |

*Primary Examiner*—Harold D. Whitehead
*Attorney, Agent, or Firm*—Frederick J. McCarthy, Jr.

[57] ABSTRACT

Adjustable hub mount for circular saw blade which enables the substantial elimination of blade wobble due to non-uniform flatness of the saw blade.

1 Claim, 5 Drawing Figures

ADJUSTABLE HUB MOUNT FOR CIRCULAR SAW BLADE

The present invention relates to the cutting or sawing of crystalline material such as single crystal boules or sapphire. More particularly, the present invention relates to an adjustable hub mount for a circular saw blade used for cutting crystalline material.

Hard crystalline material, e.g. single crystal sapphire boules prepared by the Czochralski technique, is customarily cut into thin slices of wafers in the course of preparing the material for use in the electronics industry. A common practice is to use circular saw blades comprising of steel sheets having a continuous rim diamond blade portion. In the event that the steel sheet is not truly flat, i.e. there is a significant degree of "side run-out", the saw will wobble and induce vibrations in the crystalline material which can lead to fracture. Also, if "side run-out" develops during operation, the saw must be discarded even though the blade is not worn out unless the "run-out" can be corrected.

Accordingly it is an object of the present invention to provide an adjustable hub mount for circular saw blade which enables the substantial elimination of saw blade "run-out".

Figure 1:
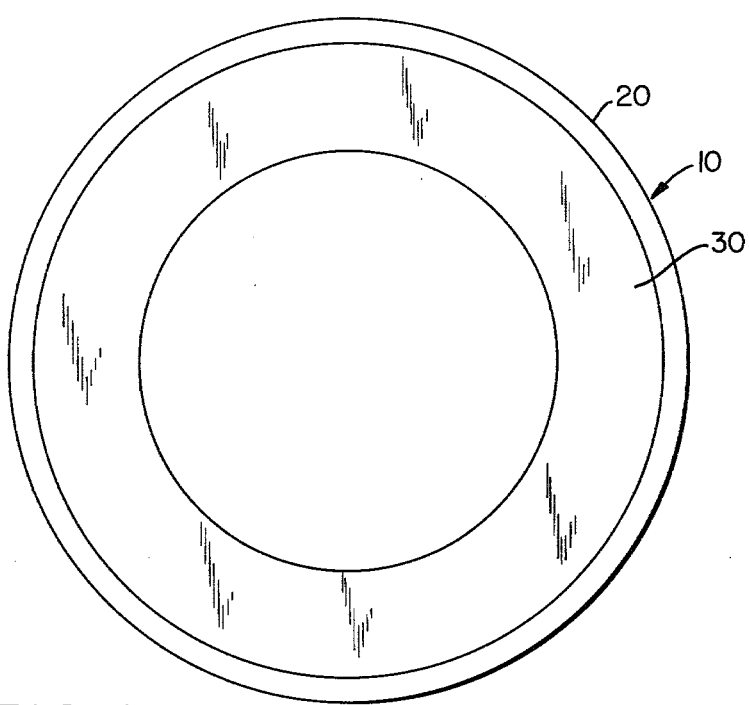
Figure 1A:
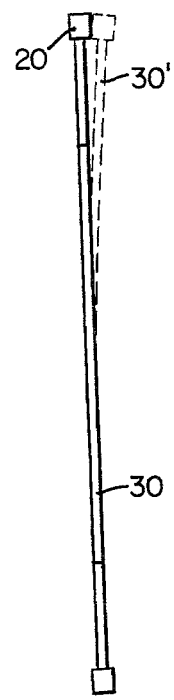
Figure 2:
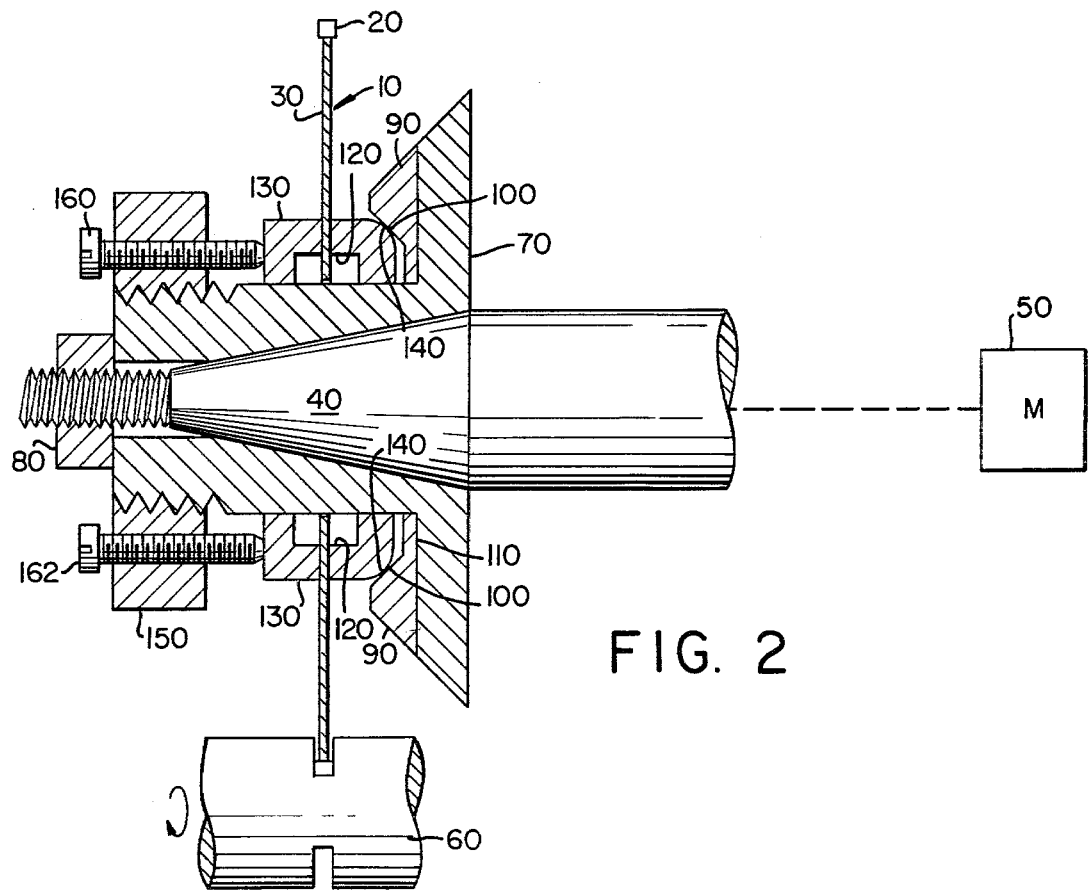
Figure 3:
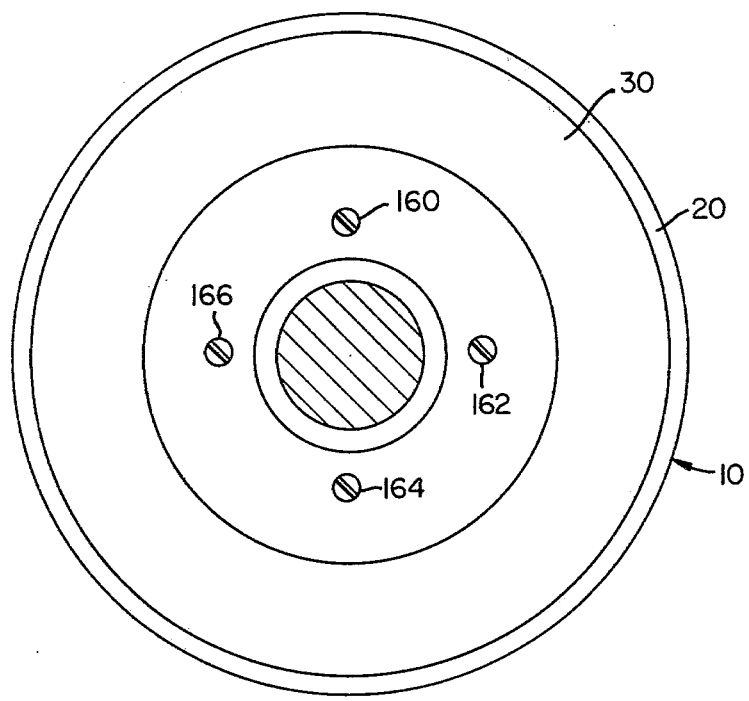
Figure 4:
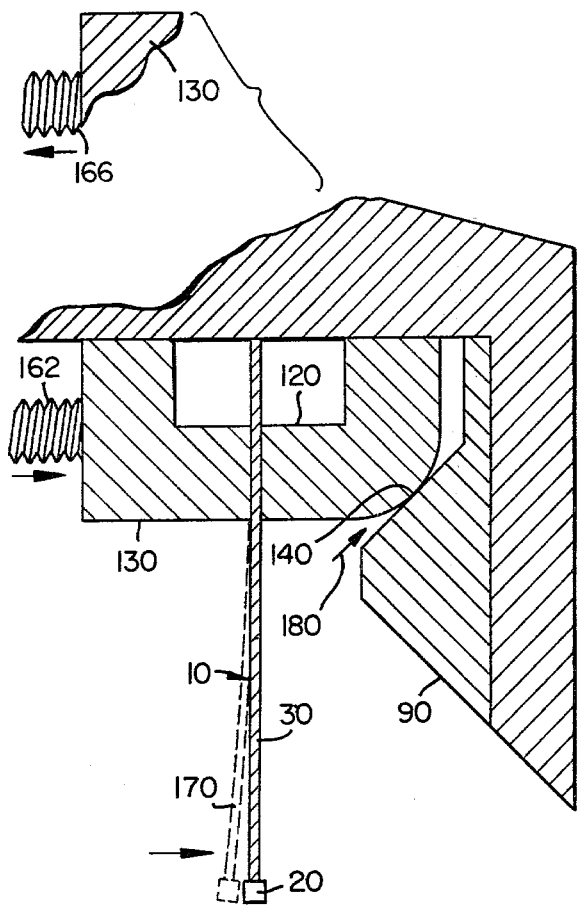

Other objects will be apparent from the following description and claims taken in conjunction with the drawing wherein FIGS. 1 and 1(a) show a circular saw blade having a continuous rim diamond blade portion FIG. 2 shows a cross-section side elevation view of an adjustable hub in accordance with the present invention FIG. 3 shows a front elevation view partly in section of a portion of the device of FIG. 2 and FIG. 4 shows an enlarged view of a portion of the device of FIG. 2.

With reference to the drawing, FIG. 1 shows at 10 a circular saw having continous rim diamond blade portion 10 on a circular steel sheet 30. A condition of "side run-out" is shown, exaggerated for effect at 30. In FIG. 2, the circular saw 10 is shown fixedly mounted on a spindle 40 of a conventional saw mechanism which is rotated by a motor 50 to cut unicrystalline boule 60, e.g. sapphire. A hub mount 70 fits on spindle 40 and is held fixed on spindle 40 by threaded nut 80. A ring member 90, having a flat bearing surface 100 abuts hub mount 70 at 110. Adjacent to ring member 90 is an inner flange 120 which, together with outer flange 130, engages circular saw 10. Inner flange 120 has round portions 140 which contacts flat bearing surface 100 of ring member 90. A threaded ring 150 engages hub mount 70. Adjustable screws 160, 162, 164, 166, shown also in FIG. 3, engage threaded ring 150 and contact outer flange 130. In the event that circular saw 10 has, or develops, a "side run-out" such as shown at 30 in FIG. 1(a), adjustment of a pair of opposite screws, e.g. 160, 164; 162, 166 will substantially eliminate the "run-out". By way of example, with reference to FIG. 4, if a "side run-out" condition exists as illustrated at 170, adjustment of screw 162 to advance screw 162 in the direction shown will cause outer flange 130 and inner flange 120 to move in the same direction since round portion 140 of the inner flange 120 will travel on the flat bearing surface 100 of ring 90 in the direction indicated at 180. As a result, saw 10 will be moved from "run-out" position 170 to the desired position shown in FIG. 4. When screw 162 is advanced as shown in FIG. 4, the opposite screw 166 must be concurrently withdrawn to enable the movement of inner flange 120 as described above. That is to say, radially opposite adjustable screws are caused to travel in opposite directions in the course of "run-out" correction. As can be readily seen, "side run-out" in any quadrant of saw 10 can be corrected by adjustment of radially opposite adjustable screws with the result that damage to the material being cut is avoided and saw life is extended.

In the device of the present invention the flat bearing surface 140 of ring member 90 is at an angle of 35° to 50°, preferably 45°, with the axis of motor spindle 40; the rotational axes of hub member 70, ring member 90, flanges 120 and 130, and threaded ring 150 are coincident. The axes of screws 160, 162, 164, 166 are parallel to the rotational axis of motor spindle 40 and the screws are located equidistant from the axis and from each other. With the device of the present invention "side run-out" is minimized and saw blade "wobble" is avoided.

What is claimed is:

1. An adjustable hub for rotating saw comprising a hub member for surroundably engaging a motor spindle of a rotating saw such that the rotational axis of said hub member and motor spindle are coincident; a ring member having its rotational axis coincident with the rotational axis of the hub member and having a flat bearing surface at an angle of about 45° with the rotational axis of said hub member; a first flange member having its rotational axis coincident with the rotational axis of said hub member and having a rounded bearing surface in contact with said flat bearing surface; a second flange member having its rotational axis coincident with the rotational axis of the hub member and located adjacent said first flange member for engaging a circular saw between first and second flange member; a threaded ring member having its rotational axis coincident with the rotational axis of said hub member and threadably engaged to said hub member; at least two pairs of independently adjustable screws engaged with said threaded ring member and passing through said threaded ring member parallel to the rotational axis of the hub member to contact said second flange member, said adjustable screws being located equidistant from the axis of the hub member and from each other.

* * * * *